(12) United States Patent
Kim

(10) Patent No.: US 7,162,281 B2
(45) Date of Patent: Jan. 9, 2007

(54) MOBILE PHONE HOLDER

(76) Inventor: Dong Joo Kim, #1-703, Hanshin APT, 256-5 Hagye-Dong, Nowon-Gu, Seoul (KR)

( * ) Notice: Subject to any disclaimer, the term of this patent is extended or adjusted under 35 U.S.C. 154(b) by 623 days.

(21) Appl. No.: 10/371,056

(22) Filed: Feb. 20, 2003

(65) Prior Publication Data

US 2003/0162510 A1   Aug. 28, 2003

(30) Foreign Application Priority Data

Feb. 22, 2002   (KR) ............... 20-2002-0005269
Apr. 16, 2002   (KR) ............... 20-2002-0011449
May 14, 2002   (KR) ............... 20-2002-0014620

(51) Int. Cl.
*H04M 1/00* (2006.01)
(52) U.S. Cl. ............... 455/575.1; 455/575.6; 455/575.8; 455/100; 455/95; 224/271; 224/196; 224/197
(58) Field of Classification Search .......... 455/575.1, 455/575.6, 575.8, 100, 95; 224/271, 196, 224/197
See application file for complete search history.

(56) References Cited

U.S. PATENT DOCUMENTS

| | | | | |
|---|---|---|---|---|
| 4,879,759 A | * | 11/1989 | Matsumoto et al. | 455/348 |
| 5,081,709 A | * | 1/1992 | Benyo et al. | 455/348 |
| 5,460,346 A | * | 10/1995 | Hirsch | 248/229.13 |
| 5,825,874 A | * | 10/1998 | Humphreys et al. | 379/446 |
| 5,995,622 A | * | 11/1999 | Roussy et al. | 379/446 |
| 6,141,417 A | * | 10/2000 | Lopez et al. | 379/446 |
| 6,786,372 B1 | * | 9/2004 | Enkerlin et al. | 224/271 |
| 2003/0000976 A1 | * | 1/2003 | Malhotra | 224/197 |

* cited by examiner

*Primary Examiner*—Matthew D. Anderson
*Assistant Examiner*—Minh Dao
(74) *Attorney, Agent, or Firm*—Lee, Hong, Degerman, Kang & Schmadeka

(57) ABSTRACT

The invention relates to a mobile phone holder for attaching a mobile phone to a body part of a user or to a dashboard or other structures in a vehicle. The mobile phone can be intermittently rotated under the manipulation of the user and attached/detached to a waist belt or the structures in the vehicle in an easy and secure manner. This prevents loss of the mobile phone while ensuring convenience in use.

16 Claims, 20 Drawing Sheets

MOBILE PHONE HOLDER

BACKGROUND OF THE INVENTION

1. Field of the Invention

The present invention relates to a mobile phone holder, in particular, which is easily attached or coupled to a body region of a user or an interior structure of a vehicle, rotated in a natural fashion according to movement of the user, and readily adjusted in angle by the user.

2. Description of the Related Art

As well known in the art, mobile phones such as a cellular phone and PCS which have been developed owing to information communication are being widely spread among common people while various functions are being added to the mobile phones according to desires of consumers. New techniques are under continuous development allowing expensive instruments to be carried and used in a more convenient and safe fashion, and examples thereof may include a so-called a handsfree holder or a holder for attaching a mobile phone to a waist belt of a user or to a dashboard of a vehicle.

The structure of such a portable phone holder will be briefly described as follows:

FIGS. 1 to 3 illustrate a type of holder which is attached to a region in a human body. The holder has a support member 2 fixed to the rear face of a housing 1 for receiving a portable phone and an hanger piece 3 coupled to the support member 2 via a fastening member 5, in which the hanger piece 3 has a number of concave fitting portions 4.

The attaching piece 10 is coupled to a holder 10 which has a body portion 11, a variable fastening portion 15, a pressing member 12, an attaching member 14 and a leaf spring 13.

The variable fastening portion 15 has a variable rotary shaft 17 removably attached to the hanger piece 3 in the rear face of the housing 1 and a variable fitting projection 17 projected in a lower portion of the variable rotary shaft 17 and selectively caught by the concave fitting portions 4 to be supported thereto.

The pressing member 12 is coupled to the body portion 11 to operate the variable fastening portion 15, the attaching member 14 is positioned in the rear face of the body portion 11, and the leaf spring 13 is coupled by both ends to the body portion 11 and the attaching member 14, respectively, for elastically supporting the lower end of the attaching member 14 toward the lower end of the body portion 11.

In such a conventional mobile phone holder, when the hanger piece 3 is inserted into the body portion 11 of the holder 10, the hanger piece 3 is coupled by its central portion to the variable rotary shaft 17 of the variable fastening portion 15, in which a corresponding one of the concave fitting portions 4 is supportedly coupled to the variable fitting projection 16. When the housing 1 is rotated from this position, the housing 1 is intermittently rotated as the concave fitting portions 4 are repeatedly coupled and released to/from the variable fitting projection 16.

FIG. 2 illustrates the coupled position between the variable fastening portion 15 and the hanger piece 3. Referring to FIG. 2, when the mobile phone is fastened to the holder 10 in a belt around the waist, the variable rotary shaft 17 of the variable fastening portion 15 is coupled to a central hole 3a of the hanger piece 3 while the variable fitting projection 16 of the variable fastening portion 15 is coupled to a corresponding one of the concave fitting portion 4 of the hanger piece 3. In this manner, the hanger piece 3 is supportedly coupled to the variable fastening portion 15.

When the mobile phone is rotated from this position, the variable fitting projection 16 of the variable fitting portion 15 is released from one of the concave fitting portions 4 as shown in FIG. 3 and coupled with another one of the concave fitting portions 4 so as to adjust the angle of the portable phone coupled to the holder 10. The conventional portable phone holder has a very weak coupling force between the variable fitting projection 16 and the concave fitting portions 4 so that the weight of the portable phone itself can arbitrarily change the position of the portable phone. In particular, the potable phone can be changed into an undesirable angle under a slight impact which may occur during walking.

One of reasons for this problem relates to the coupling depth d between the variable fitting projection 16 and the corresponding one of the concave fitting portions 4. If the concave fitting portions 4 of the hanger piece 3 have a too large depth d, the variable fitting projects 16 can be securely inserted and supported into the same so as to prevent any undesired rotation of the portable phone. However, when the portable phone is to be rotated, the variable fitting projection 16 may not be smoothly released from the concave fitting portions 4 so that the portable phone can be hardly adjusted in angle.

Therefore, the conventional portable phone holder is necessarily manufactured so that the variable fitting projection 16 is readily released from the concave fitting portions 4. For the purpose of this, it is required to manufacture the portable phone holder so that the end of the variable fitting projection 16 is slightly caught by the concave fitting portions 4 as shown in FIGS. 2 and 3. As set forth above, this results in a very weak coupling force between the variable fitting portion 16 and the concave fitting portions 4 so that the portable phone which is adjusted in angle is rotated into an undesired angle without being suitably supported.

Further, since the conventional portable phone holder is generally fixed to only a belt clip in use, a normal effect can be rarely expected if the waist belt is not worn. If the holder is fixed to the waist belt, it can be loosed down. Even if a slightest force is applied, the holder can be released even causing a reason of losing the portable phone.

Further, as the attaching member 14 in FIG. 1 is attached to the waist belt under the elastic force of the leaf spring 13, when a user sits on a chair or bends his/her waist as wearing the mobile phone, a lower portion of the housing 1 presses a body portion with a force larger than the elastic force of the leaf spring 13 so that the attaching member 14 can be released from the waist belt thereby causing the mobile phone to be lost.

In the meantime, FIGS. 4 and 5 shows a conventional holder structure installed in a vehicle. The holder 20 has a fixing plate 22 attached to a dashboard of a vehicle 27 and a holder body 21 installed on the fixing plate 22 with a hanging groove 23. The fixing plate 22 is generally made of flexible synthetic resin and the holder body 21 is made of rigid synthetic resin, in which the fixing plate 22 and the holder body 21 are fixedly connected via a connecting portion 25 as shown in FIG. 5.

In the holder 20 configured as above, a separately provided hanger piece 26 is attached to the rear portion of mobile phone M and then a coupling portion 26a of the hanger piece 26 is fixedly inserted into the hanging groove 23 in a vertical direction to be placed in a receiving space 24 of the holder body 21 so that the mobile phone M can be hanged. The un-designated reference number 26b is a double-sided tape.

However, in the conventional holder 20 of this configuration, the angle of the holder body 21 cannot be changed at all thereby creating a problem that sometimes a driver cannot watch a liquid crystal display of the mobile phone.

Further, the fixing plate 22 is attached to the dashboard 27 of the vehicle by using the double-sided tape 22a in general. If the dashboard 27 is heavily curved, attachment is not easy. Moreover, even if the fixing plate 22 is attached, the fixing plate 22 may be easily detached from the dashboard owing to vibration and impact of the vehicle and the weight of the mobile phone.

SUMMARY OF THE INVENTION

The present invention has been made to solve the foregoing problems and it is therefore an object of the present invention to provide a mobile phone holder which prevents release of a mobile phone from any object to which the mobile phone is fixed so as to prevent loss thereof while allowing the mobile phone to be naturally adjusted in angle not to cause the user any inconvenience.

It is another object of the invention to provide a mobile phone holder which fixedly attaches a mobile phone to an interior structure of a vehicle while allowing the mobile phone to be adjusted in angle if needed and the adjusted position to be securely maintained.

According to an aspect of the invention to obtain the above objects, it is provided a mobile phone holder assembly comprising: a hanger piece fixed to a rear face of a mobile phone or a mobile phone housing; a holder body having a guide in a front portion into which the hanger piece is inserted downward and supported therein and a vertical slide slot; a locker coupled to the slide slot in a vertically displaceable manner; a rear plate fixed to a rear face of the holder body; means for restraining vertical displacement of the locker and supporting the hanger piece inserted through the guide in a rotatable position; means for maintaining rotation angle of the hanger piece; a clip disposed in a rear portion of the rear plate, the clip being pivotable about the upper end; and a locking member for pressing or releasing the upper end of the clip so that a lower portion of the clip pressingly contacts with a lower portion of the rear plate.

In the invention as above, the holder can conveniently and securely attach the mobile phone to a body part of a user, in which the mobile phone can be freely rotated as desired by the user and maintain the rotated position in respect to the holder unless any external force is not applied.

According to another aspect of the invention to obtain the above objects, it is provided a mobile phone holder assembly comprising: a hanger piece fixed to a rear face of a mobile phone or a mobile phone housing; a rectangular panel-shaped fixing plate detachably attached to an exterior structure; a holder body coupled to the fixing plate in a laterally rotatable state via a rotation mechanism and having a hanging slot in a front portion into which the hanger piece is inserted downward and supported therein; and means for attaching the fixing plate to the exterior structure.

In the holder of the invention as above, a driver in a vehicle can rotate a mobile phone laterally in respect to the holder to adjust angular field thereby advantageously obtaining convenience in use.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following detailed description will present a preferred embodiment of the invention in reference to the accompanying drawings.

Figure 1:
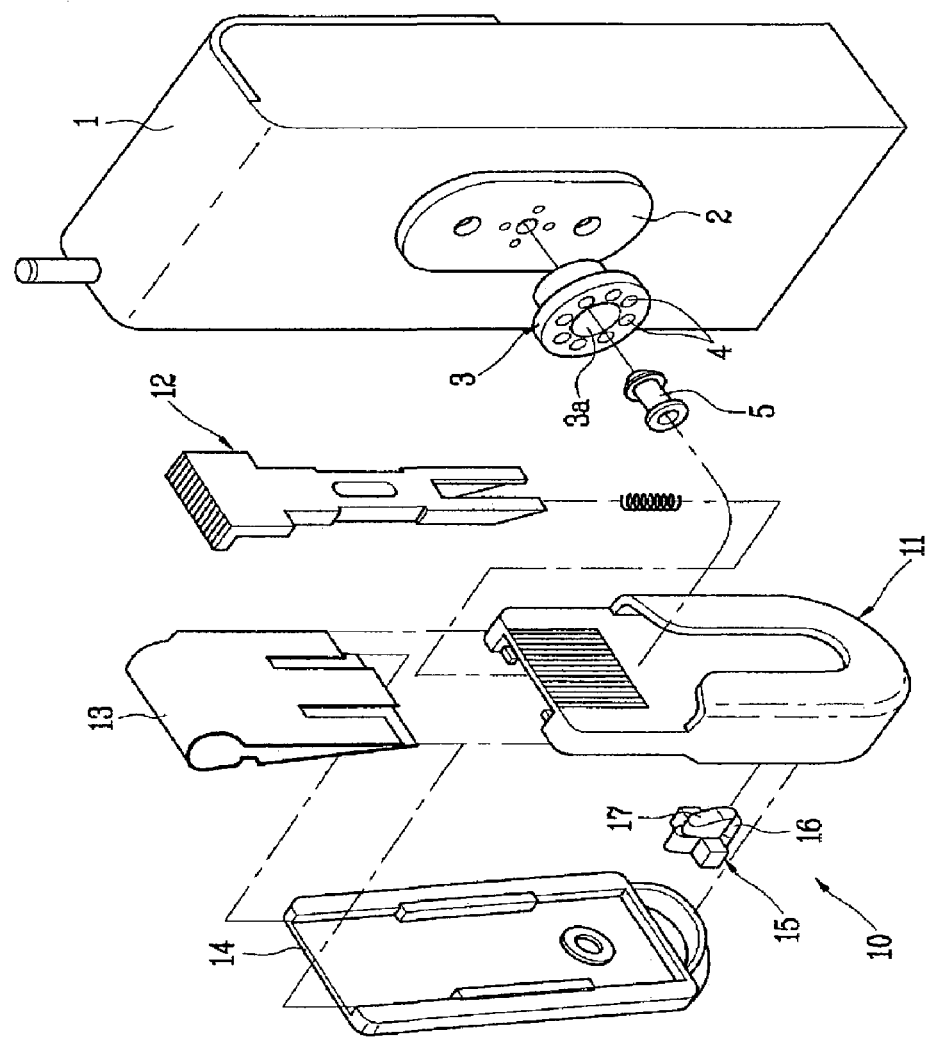
FIG. 1 is an exploded perspective view a conventional mobile phone holder attachable to a body part of a user.
Figure 2:
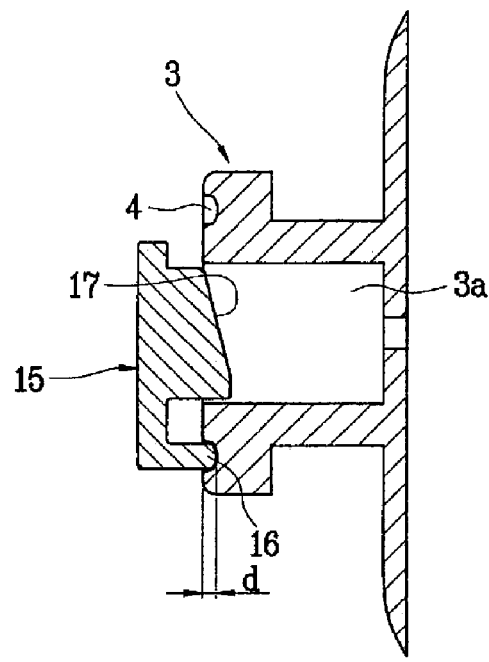
FIGS. 2 and 3 are sectional view of the conventional mobile phone holder attachable to a body part of a user.
Figure 3:
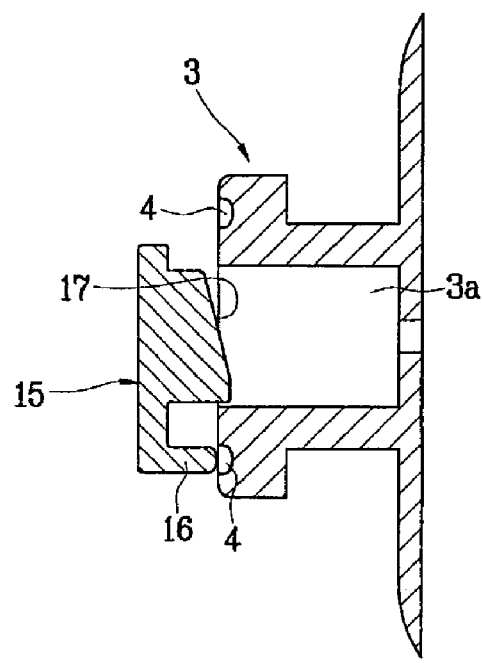
Figure 4:
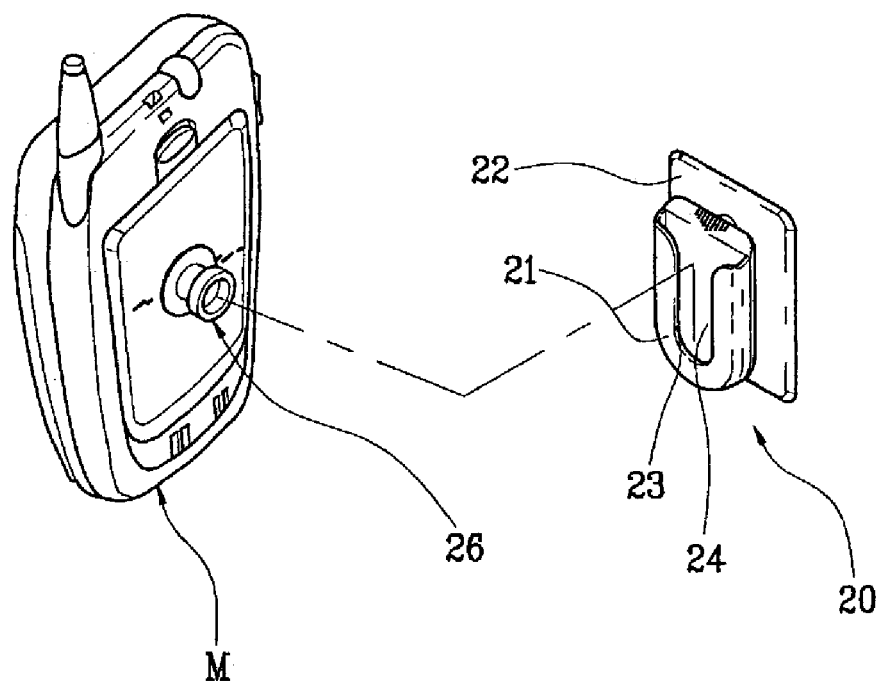
FIG. 4 is an exploded perspective view a conventional mobile phone holder attachable to a vehicle.
Figure 5:
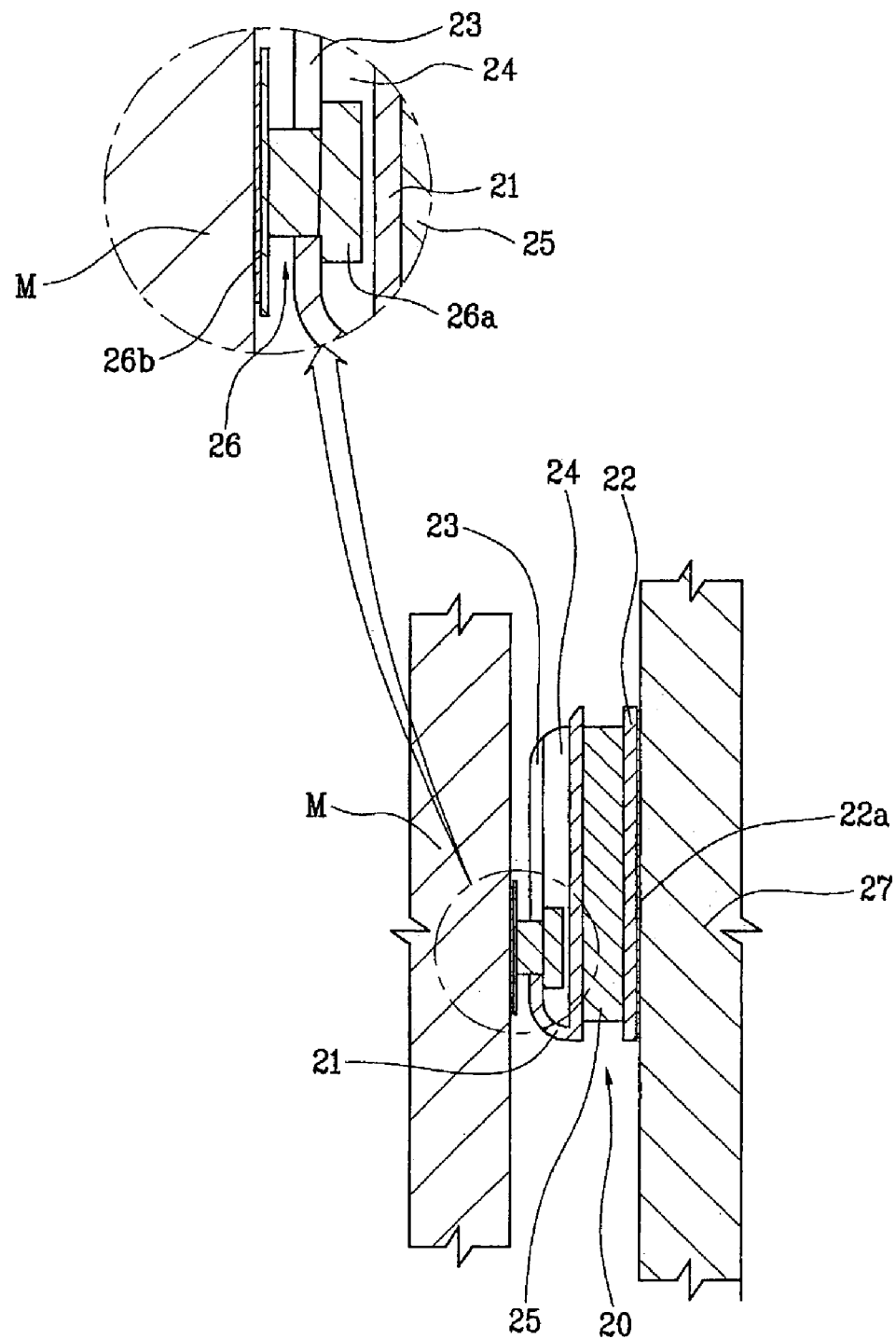
FIG. 5 is a sectional view of the conventional mobile phone holder attachable to a vehicle.
Figure 6:
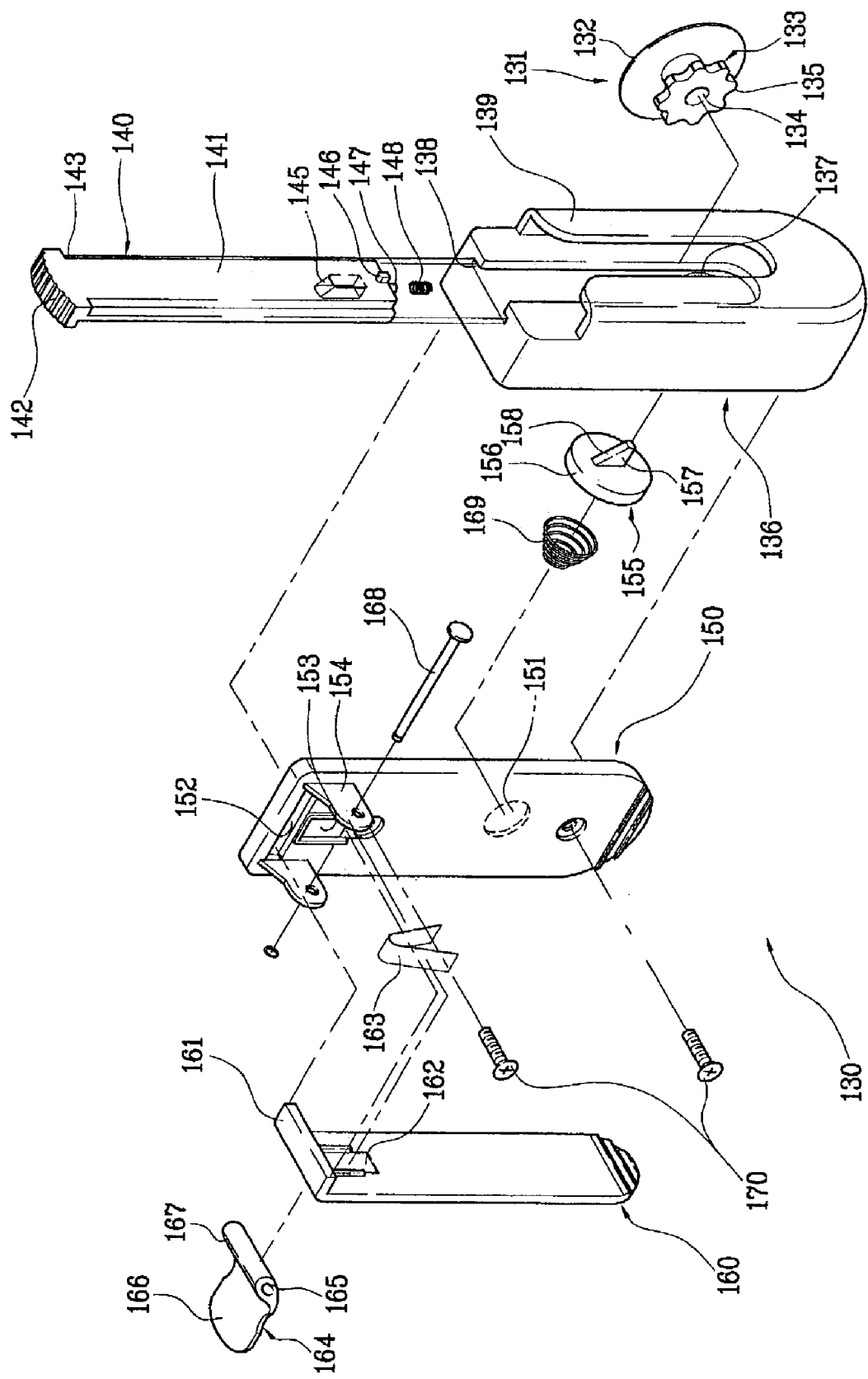
FIG. 6 is an exploded perspective view of a mobile phone holder according to the first embodiment of the invention.
Figure 7:
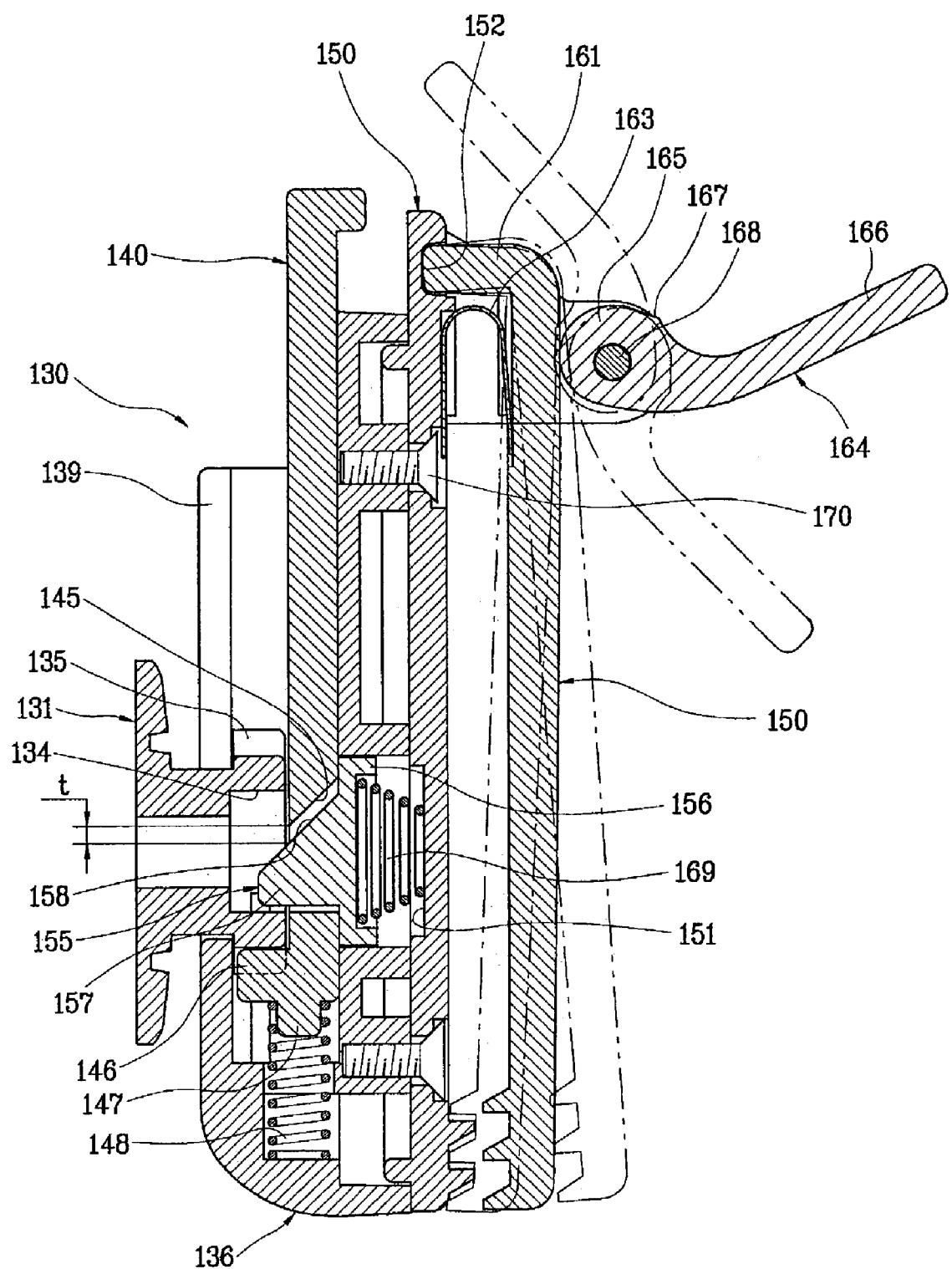
FIG. 7 is a sectional view illustrating the assembled state of the mobile phone holder shown in FIG. 6.
Figure 8:
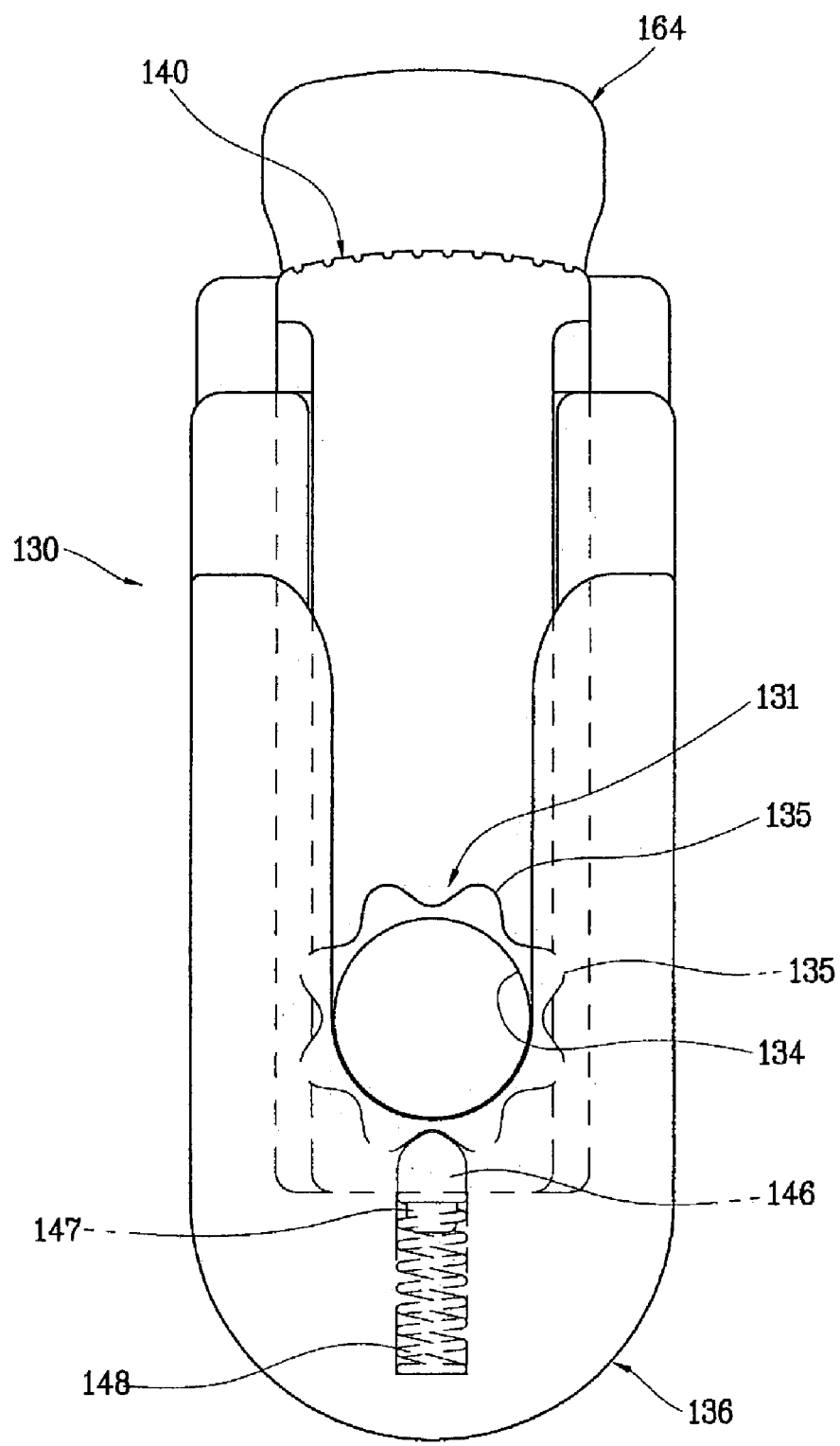
FIG. 8 is a front elevation view illustrating the assembled state of the mobile phone holder shown in FIG. 6.
Figure 9:
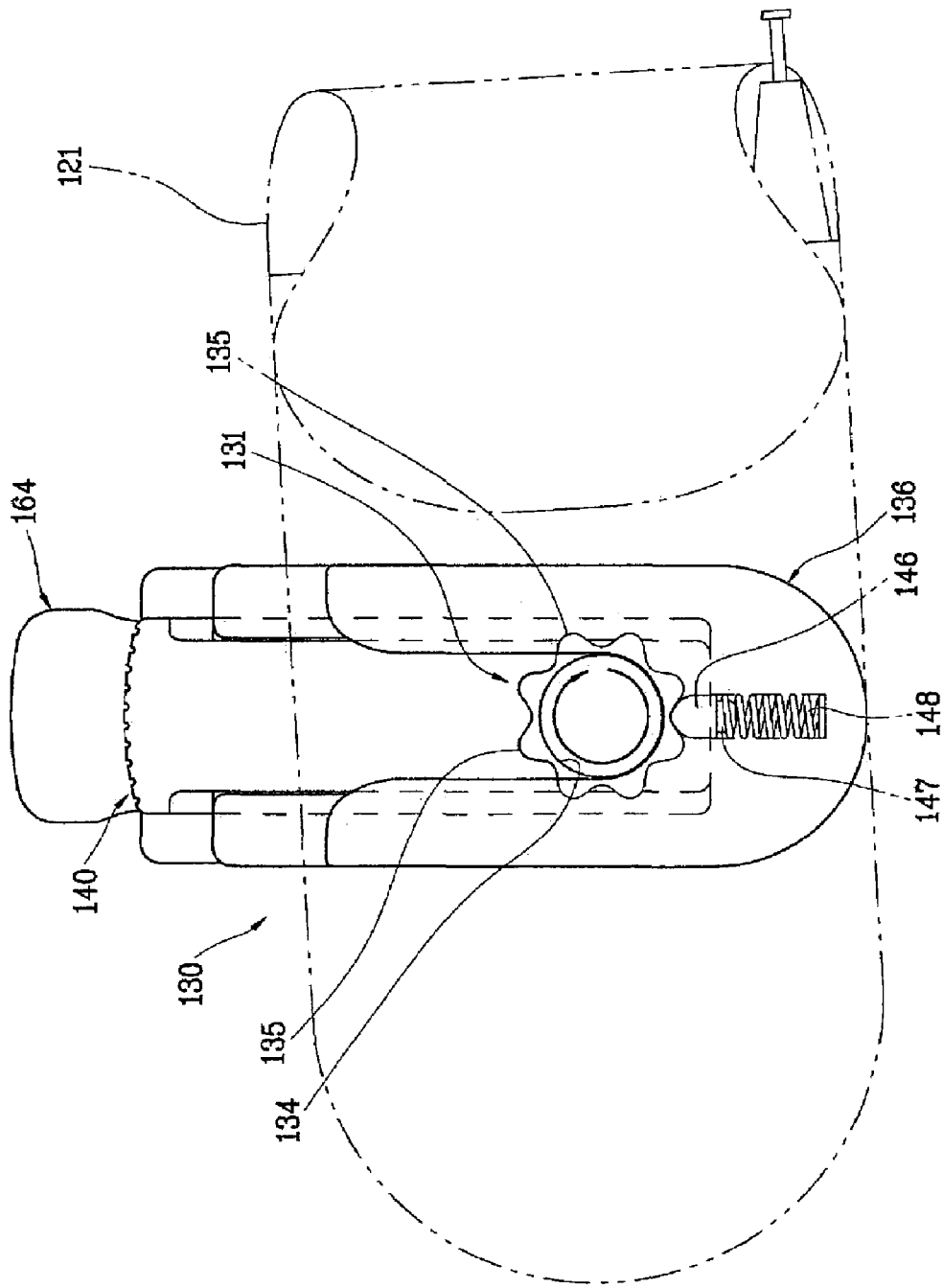
FIG. 9 is a front elevation view illustrating an application of the mobile phone holder of the invention.
Figure 10:
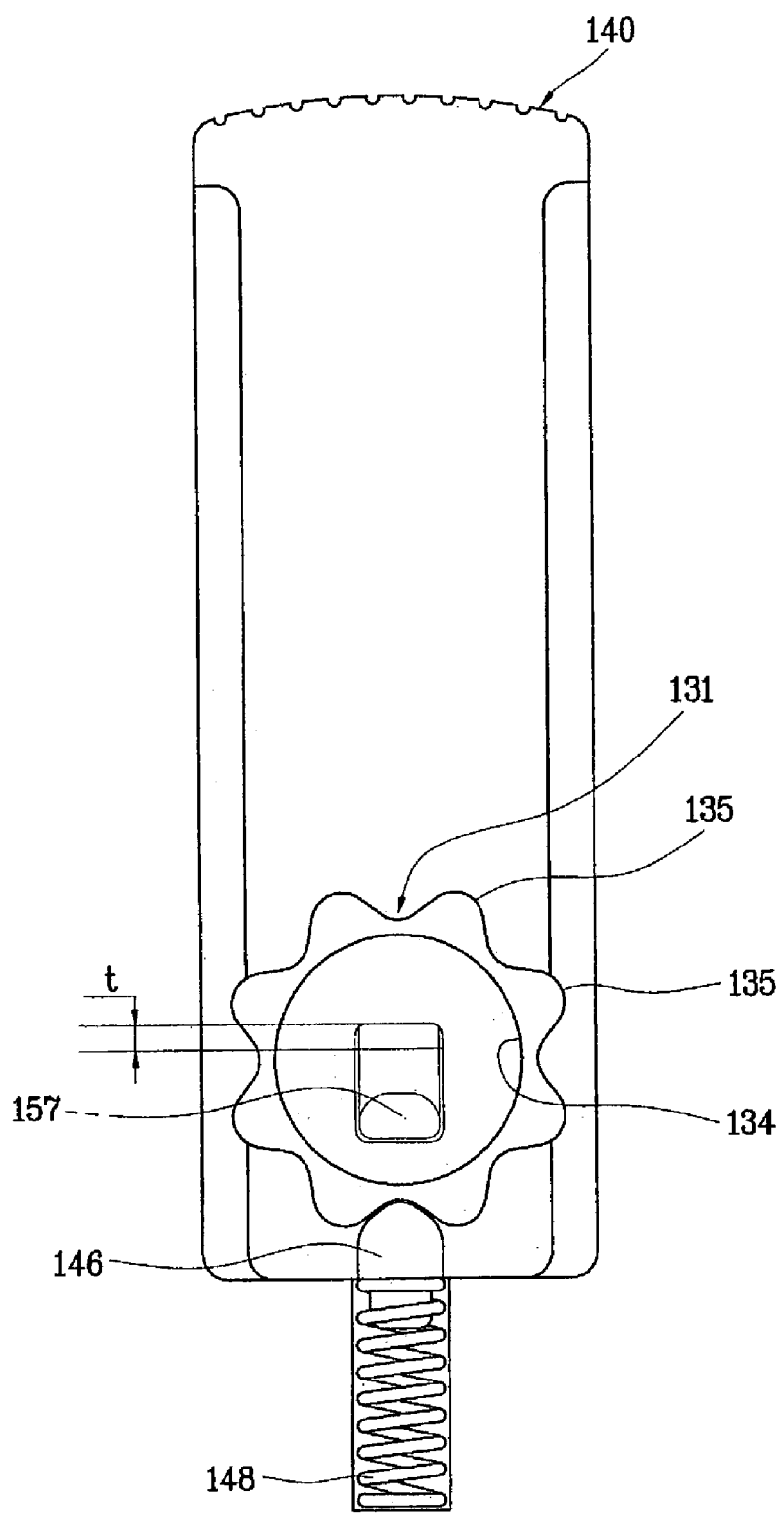
FIG. 10 is a front view of the mobile phone holder according to one embodiment of the invention.
Figure 11:
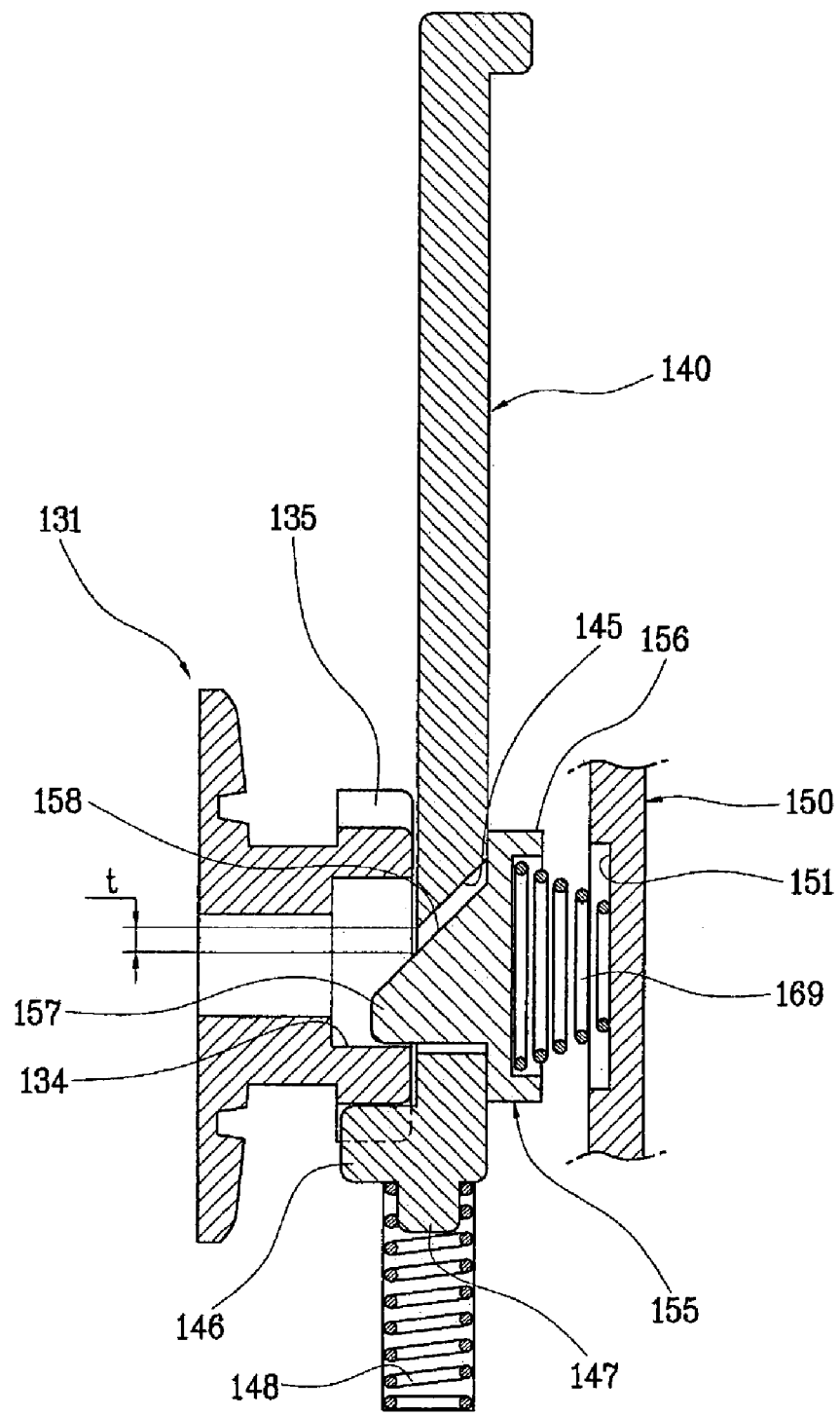
FIGS. 11 to 15 are drawings illustrating cooperation among major parts according to angle adjustment of the mobile phone holder of the invention.

FIG. 6 is an exploded perspective view of a mobile phone holder according to the first embodiment of the invention. Referring to FIG. 6, the mobile phone holder 130 of the invention has an hanger piece 131, a holder body 146, a locker 140, an operating piece 155, a rear plate 150, a clip 160, a locking piece 164 and two springs, i.e. a locker spring 148 and an operating piece spring 169.

In both sides of the front portion of the holder body 136, slide grooves 138 are provided along a vertical direction. In front of the slide grooves 138, a guide 139 is provided along the longitudinal direction thereof for guiding the periphery of the hanger piece 131 which will be described hereinafter. In a central portion of the holder body 136, a through-hole 137 is provided.

The hanger piece 131 has a fixing portion 132 coupled to the rear face of a mobile phone or a housing thereof and an operating portion 133 connected to a central portion of the fixing portion 132 and having a plurality of peripheral meshing projections 135 in a radial configuration and a central bore 134 in a central portion of the meshing projections 135.

The locker 140 has an elongated portion 141, a pressing portion 142 in the upper end of the elongate portion 141 and guide thresholds 143 at both sides of the elongated portion 141. The guide thresholds 143 are correspondingly coupled to the slide grooves of the holder body 136 and vertically displaced along the same.

Further, the locker 140 has an operating hole 144 in a lower portion of the elongated portion 141 and an inclined pressing face 145 above the operating hole 144. The pressing face 145 is so provided to face the through-hole 137 of the holder body 136 when the locker 140 is coupled to the holder body 136. In a lower front portion of the locker 140, a coupling projection 146 is projected.

When the hanger piece 131 is coupled to the holder body 136, the coupling projection 146 of the locker is closely supported by its upper portion between the two adjacent one of the meshing projections 135. When the hanger piece 131 is rotated, the meshing projections 135 repeatedly force the locker 140 downward while passing along the coupling projection 146.

In the lower face of the locker 40, a fixing projection 147 is extended according to a feature of the invention. Below the fixing projection 147, a locker spring 148 is provided in the bottom of the holder body 136 corresponding to the fixing projection 147 according to another feature of the invention.

The rear plate 150 is coupled to the rear face of the holder body 136 via bolts 170. The rear plate 150 has horizontal vertical slots 152 and 153 formed into a T-shape in an upper portion of the rear plate 150, hinge brackets 154 at both sides of the horizontal and vertical slots 152 and 153, and a spring settling groove 151 in the inner face of the rear plate 150.@

The operating piece 155 comprises a base 156 for being coupled to the spring settling groove 151 of the rear plate 150 and a latch 157 projected from a portion of the base 156. The latch 157 provided in one face of the base 156 is inserted into the operating hole 144 of the locker 140, and has a guide face 158 opposed to the pressing face 145 of the operating hole 144. The operating hole 144 is wider than the vertical width of the latch 157 so that a tolerance t is formed with a predetermined magnitude between the pressing face 145 and the guide face 158.

The operating piece spring 169 is provided between the base 156 of the operating piece 155 and the spring settling groove 151 of the rear plate 150 to elastically support the guide face 158 of the operating piece 155 toward the pressing face 145 of the locker 140.

The clip 160 has a folded portion 161 having a point-symmetric shape of L to be placed in the horizontal slot 152 of the rear plate 150 and an entrance 162 under the folded portion 161 opposite to the vertical slot 153 of the rear plate 150.

Between the entrance 162 of the clip 160 and the vertical slot 153 of the rear plate, a leaf spring 163 is interposed to outwardly spreading the lower end of the clip 160.

The locking piece 164 comprises a hinge 165 disposed between two hinge brackets 154 which are backwardly projected from two lateral portions of the upper end of the rear plate 150 and coupled to the hinge brackets 154 via a hinge pin 168, a gripping portion 166 extended relatively wide from one side of the hinge 165 and a pressing portion 167 projected from the hinge 165 substantially perpendicular to the gripping portion 166 for pressing and supporting the outer upper end of the clip 160.

In the mobile phone holder of the invention having the above configuration, when the hanger piece 131 is coupled to the holder 130 as attached to the mobile phone or the receiver housing of the mobile phone, the operating portion 133 of the hanger piece 131 is guided along the guide 139 of the holder body 136. When the operating portion 133 is completely inserted into the guide 139, the latch 157 of the operating piece 155 is inserted into the central bore 134 of the operating portion 133. Then, as shown in FIGS. 7 to 11, two of the meshing projections 135 of the hanger piece 131 are closely supported on the coupling projection 146 of the locker 140.

Figure 12:
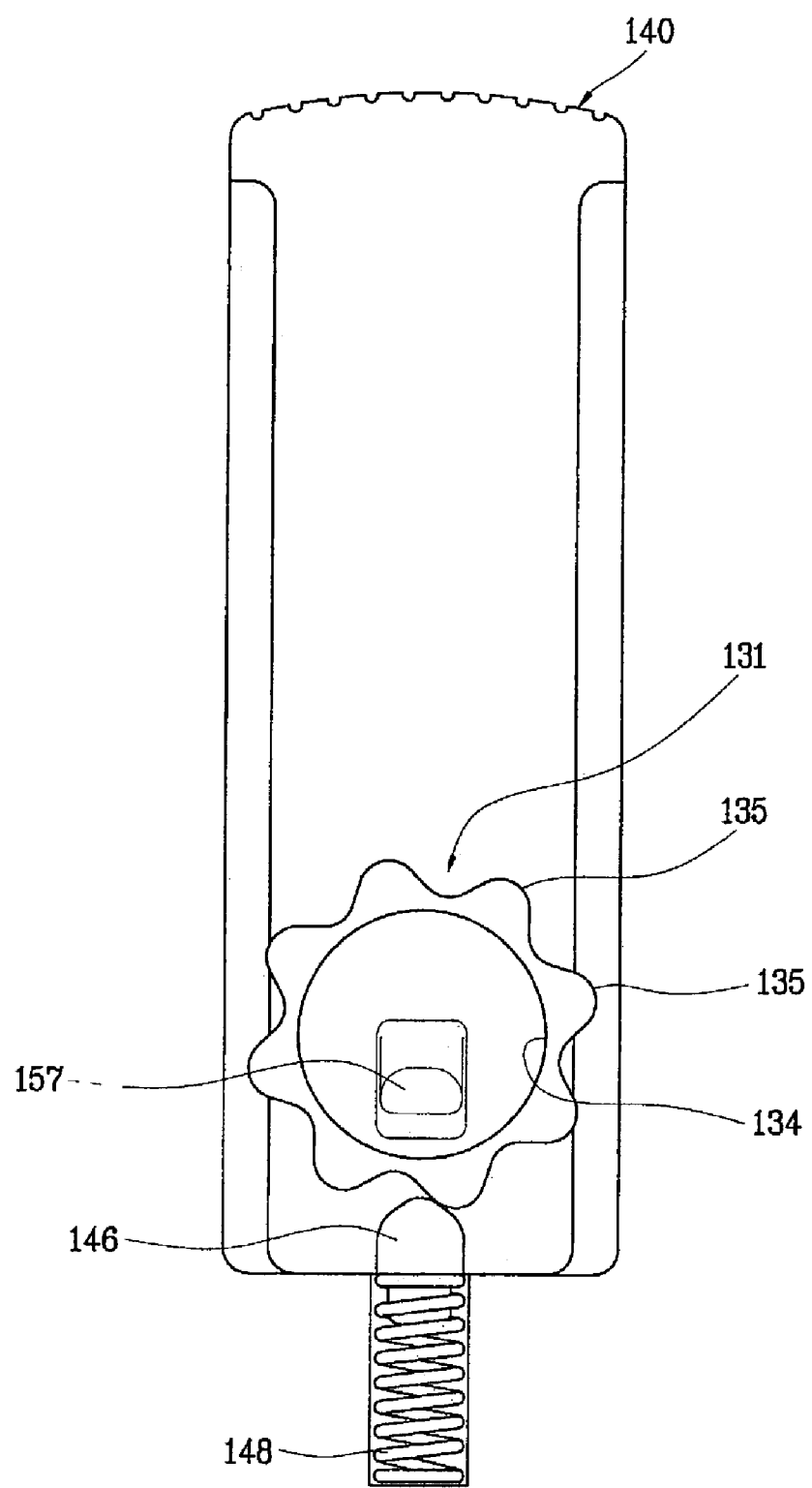
Figure 13:
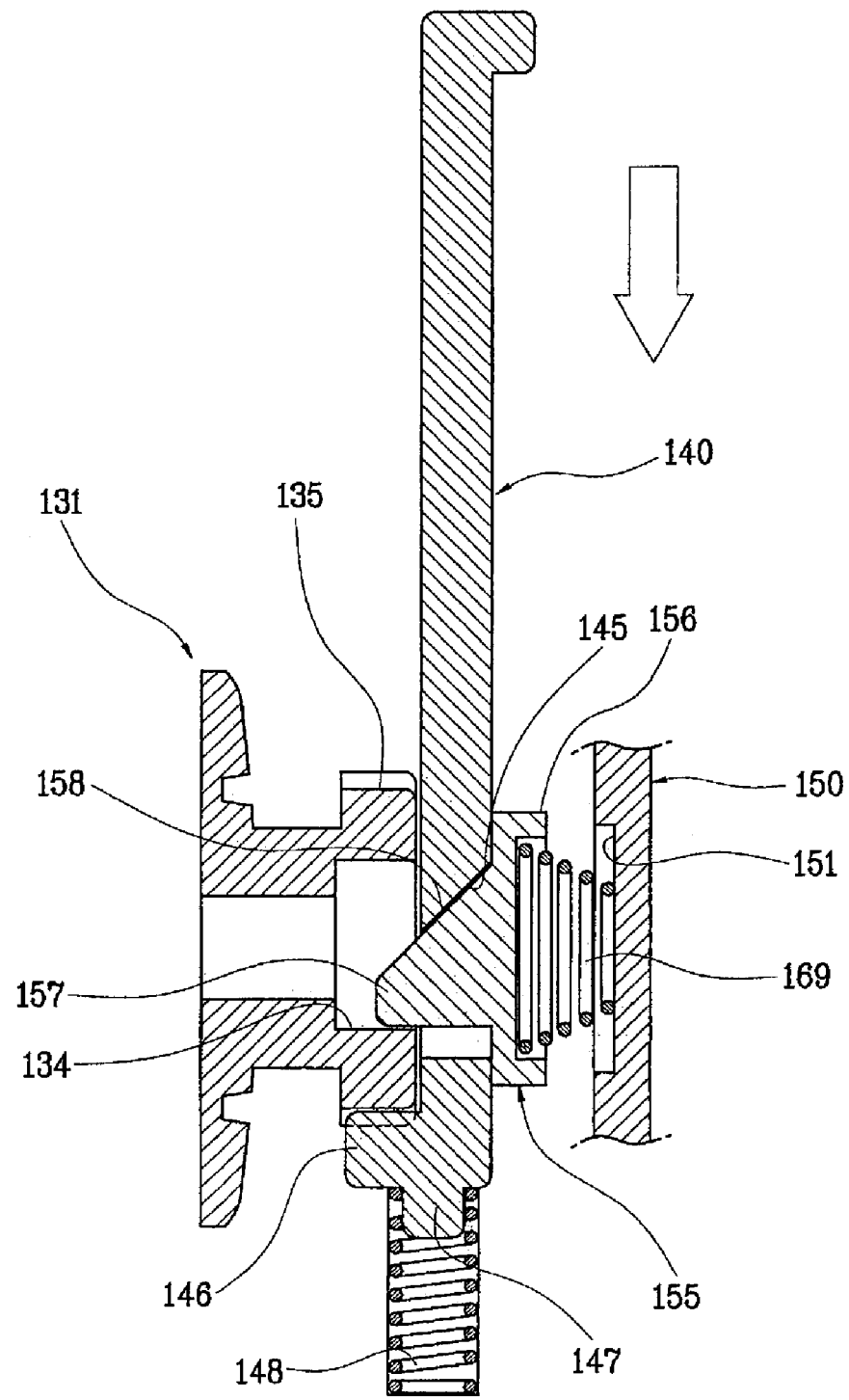
Figure 14:
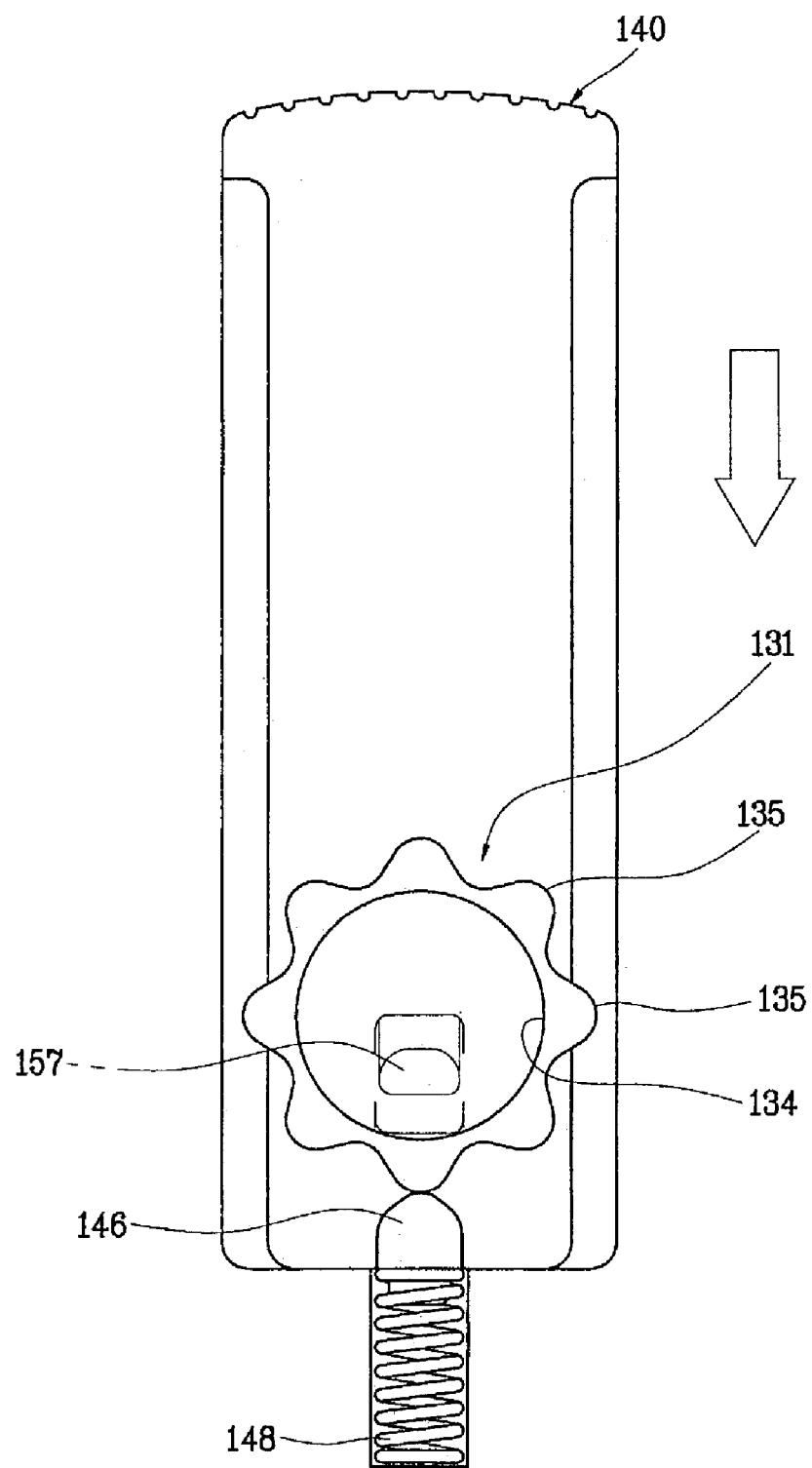
Figure 15:
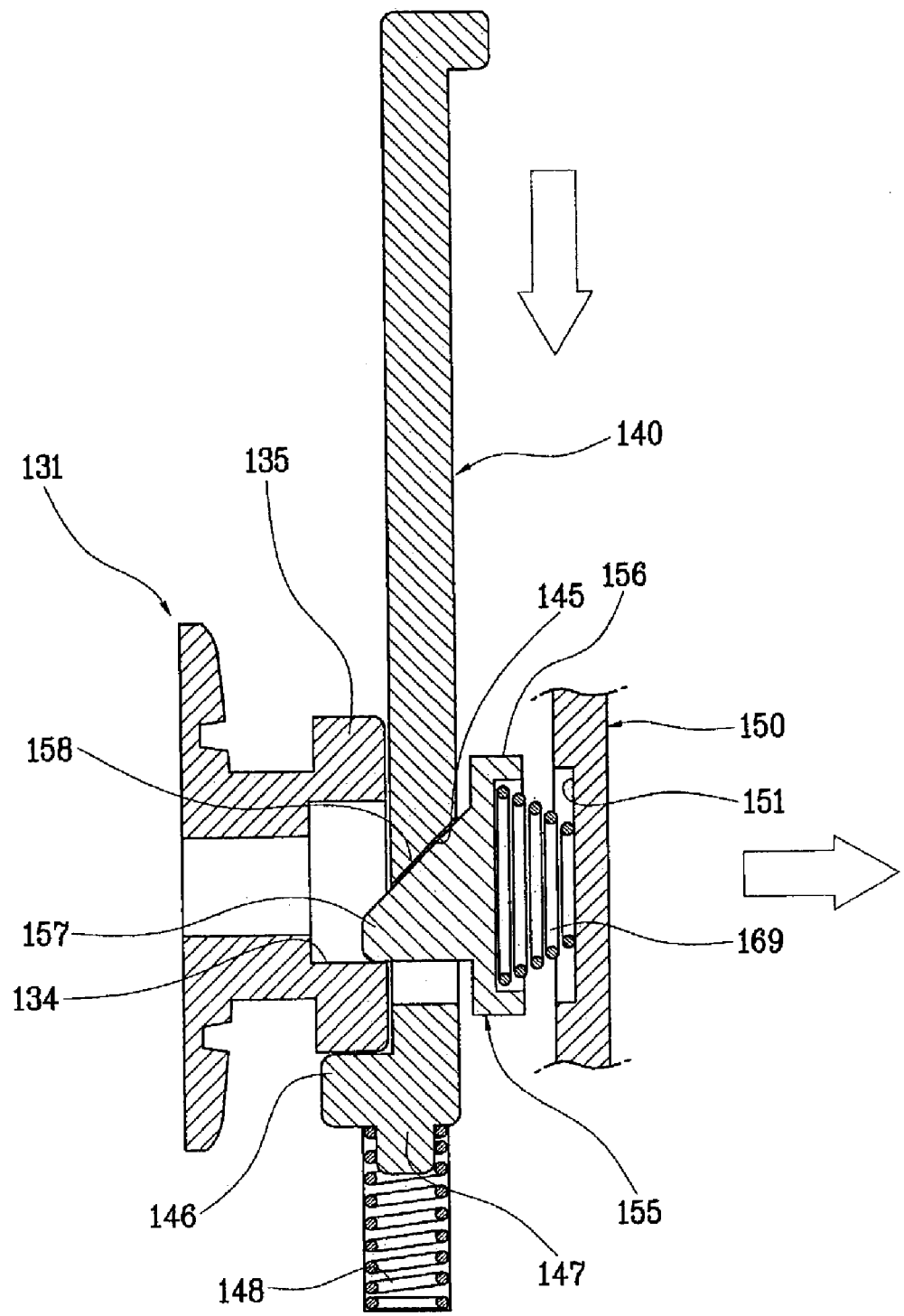

If the attached mobile phone is rotated once to the right or left from this position, the meshing projections 135 of the hanger piece 131 and the coupling projection 146 of the locker 140 cooperate as follows. As shown in FIGS. 12 and 13, any of the meshing projects 135 adjacent to the coupling projection 146 presses the coupling projection 146 downward so that the locker spring 148 is compressed displacing the locker 140 downward. As the tolerance t between the latch 157 and the operating hole 144 is decreased, the pressing face 145 of the locker 140 contacts with the guide face 158 of the operating piece 155. When the thread of one of the meshing projections 135 is placed on the coupling projection 146 as shown in FIGS. 14 and 15, the pressing face 145 presses the guide face 158 by the largest quantity so that the operating piece 155 is displaced toward the rear face 150 compressing the operating piece spring 169 by the largest quantity.

At this position, the end of the latch 157 of the operating piece 155 is still supported on the central bore 134 of the hanger piece 131 so that the hanger piece 131 is not released from the holder 130. Accordingly, the mobile phone is not released from the holder 130 while the angle of the mobile phone is being adjusted, i.e. the meshing projections 135 of the hanger piece 131 are passing along the coupling projection 146 of the locker 140.

If the hanger piece 131 is further rotated from this position and thus the coupling projection 146 of the locker 140 is placed between two roots of the meshing projections 35 from the thread of the one meshing projection 135, the compressed operating piece spring 169 and the locker spring 148 are restored to elastically re-support the locker 140 upward.

In the mobile phone holder of the invention as set forth above, the locker 140 is instantaneously elevated owing to the elastic force of the operating piece spring 169 and the locker spring 148 while the meshing projections 135 of the hanger piece 131 pass along the coupling projection 146. At this time, the meshing projections 146 collide into the coupling projection 146 in sequence sounding 'tick.'

When the mobile phone or the housing 121 is rotated with the hanger piece 131 being coupled to the holder 130, the inventive holder intermittently sounds 'tick' thereby maximizing an acoustic effect.

The mobile phone holder of the invention as above has the following advantages:

First, the locker spring 148 elastically supports the locker 140 upward and the operating piece spring 169 elastically supports the operating piece 155 toward the locker 140. That is, the locker 140 is elastically supported upward by both of the springs so as to correspondingly enhance the coupling force between the meshing projections 135 of the hanger piece 131 and the coupling projection 146 of the locker 140. Therefore, unless compelled to rotate, the mobile phone adjusted in angle would not arbitrarily rotate owing to the self-weight or any impact transferred to the mobile phone in walking.

Second, since the tolerance t exists for a predetermined magnitude between the guide face 158 of the operating piece 155 and the pressing face 145 of the locker 140, the operating piece 155 would not be directly pressed when the locker 140 descends owing to rotation of the meshing projections 135 of the hanger piece 131. That is, the locker 140 presses the operating piece 155 toward the rear face 150 after descending as long as the tolerance t so as to minimize backward displacement of the operating piece 155 according to angle-adjustment of the mobile phone. This prevents release of the latch 157 of the operating piece 155 from the central bore 134 of the hanger piece 131 thereby overcoming a problem that the mobile phone may be released from the holder in angle-adjustment of the mobile phone.

According to another important feature of the mobile phone holder of the invention, it is provided a clip structure defined by the rear plate 150, the clip 160, the locking piece 164 and the leaf spring 163. The clip structure functions to securely attach the holder 130 to a waist belt.

That is, If the locking piece 164 is pivoted making the pressing portion 167 press the corresponding face of the clip 160, the lower end of the clip 160 is closely supported to the corresponding lower end of the rear plate 150 while the leaf spring 163 is compressed. If the locking piece 164 is rotated reverse releasing the pressing portion 167 from the outer face of the clip 160, the leaf spring 163 is elastically restored spreading the lower end of the clip 160 to the opposite direction of the lower end of the rear face 150. Therefore, a user can fix or release the clip 160 of the holder 130 to/from the waist belt by vertically pivoting or rotating the locking piece 164.

In the mobile phone holder of the invention as above, once the holder 130 is fastened to the waist belt by the locking piece 164, the clip 160 of the holder 130 is not released from the waist belt unless the locking piece 164 is pivoted or a component is broken. Therefore, the holder 130 is reliably and securely attached to the waist belt preventing loss of the mobile phone.

Figure 16:
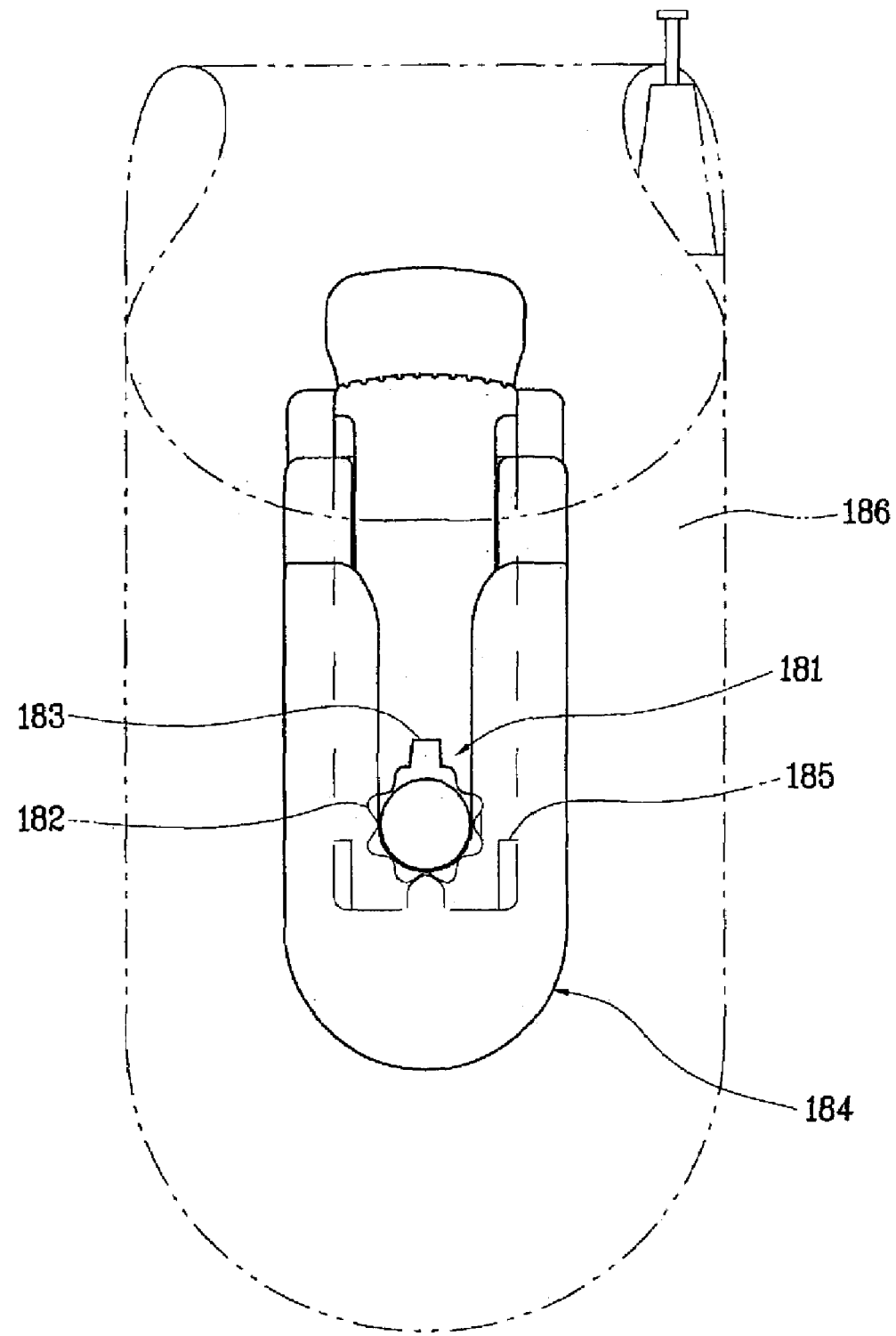
FIGS. 16 and 17 are schematic front elevation views of a mobile phone holder according to the second embodiment of the invention.
Figure 17:
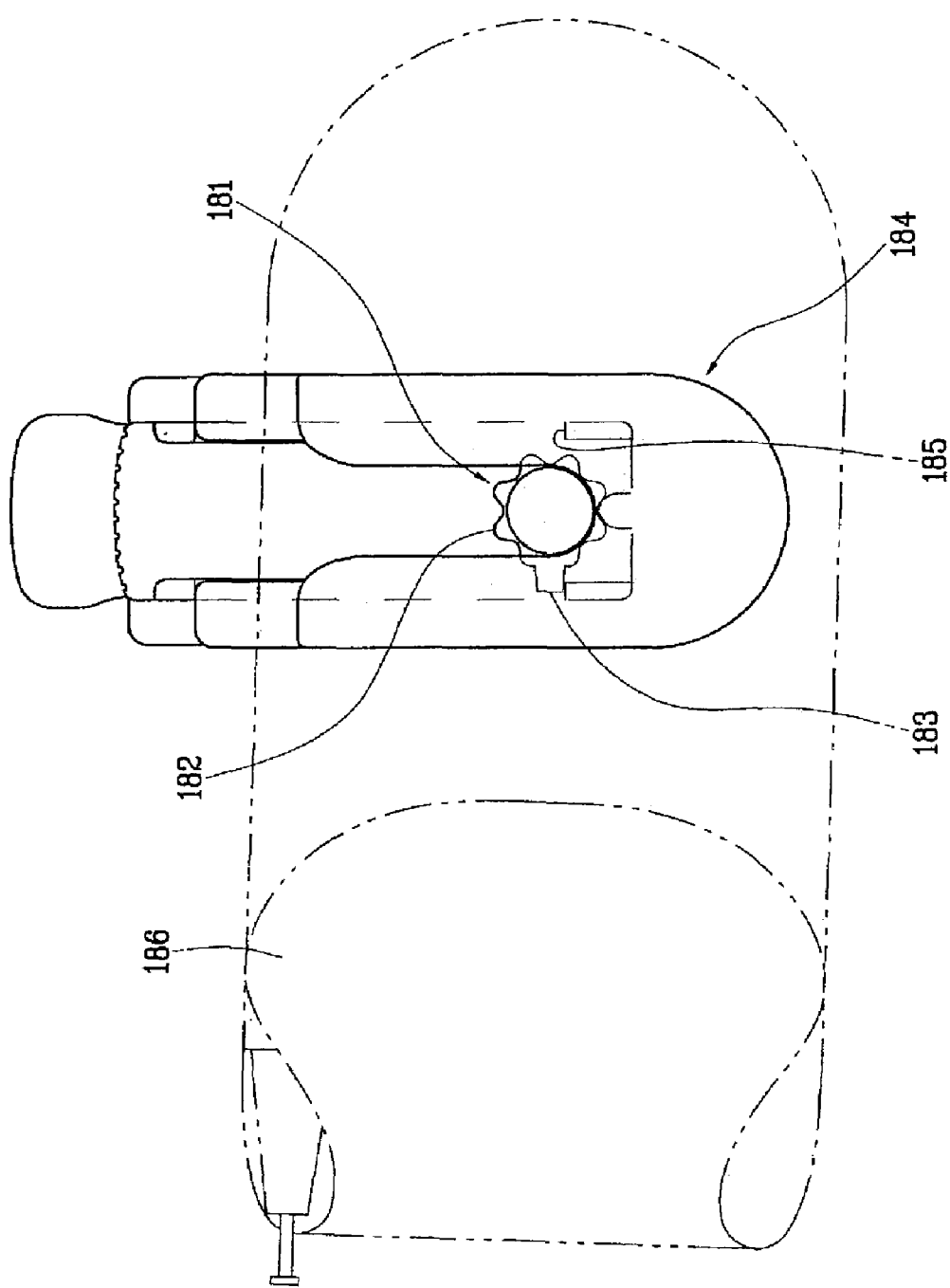

FIGS. 16 and 17 illustrate a mobile phone holder according to the second embodiment of the invention, in which an angle-restraining projection 183 is provided between meshing projections 182 of a hanger piece 181 and angle-restraining thresholds 185 are further provided at both lower lateral sides in a slide groove of a holder body 184.

This can advantageously restrain the adjustment in angle of a housing 186: When the hanger piece 182 is rotated for about 90 deg. from the position in FIG. 16 to the position in FIG. 17, the angle-restraining projection 183 collides into the angle-restraining thresholds 185 of the holder body 184 so that the hanger piece 181 is not rotated any longer.

Therefore, the mobile phone holder as above prevents unnecessarily excessive rotation of the mobile phone or the housing 186. This prevents the housing 186 from being inadvertently rotated beyond 90 deg so that the mobile phone would not be released from the housing 186 or lost.

Figure 18:
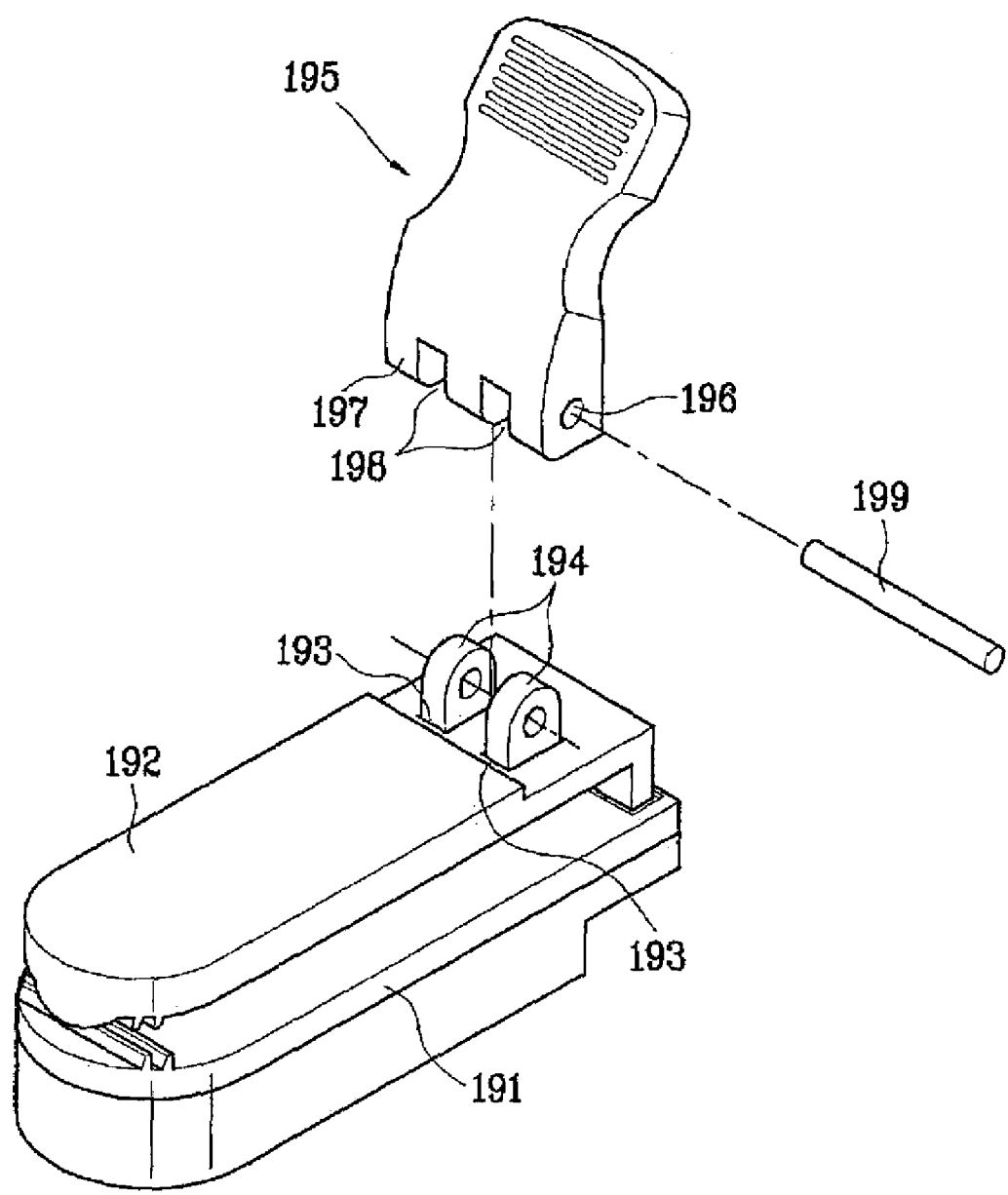
FIG. 18 is a partial schematic perspective view of a mobile phone holder according to the third embodiment of the invention.

FIG. 18 is a perspective view of a mobile phone holder according to the third embodiment of the invention, in which two through-holes 193 are formed in an upper middle portion of clip 192 and hinge brackets 194 integral with a rear plate 191 are projected backward of the clip 192 via the through-holes 193.

Ends of the hinge brackets 194 projected through the through-holes 193 are inserted into two incisions 198 which are provided in a hinge 196 and a pressing portion 197 of a locking piece 195. After the hinge brackets 194 are inserted into the incisions 198, a hinge pin 199 is coupled into the hinge brackets 194 and the hinge 196 from an outer portion of the hinge 196 of the locking piece 195.

Figure 19:
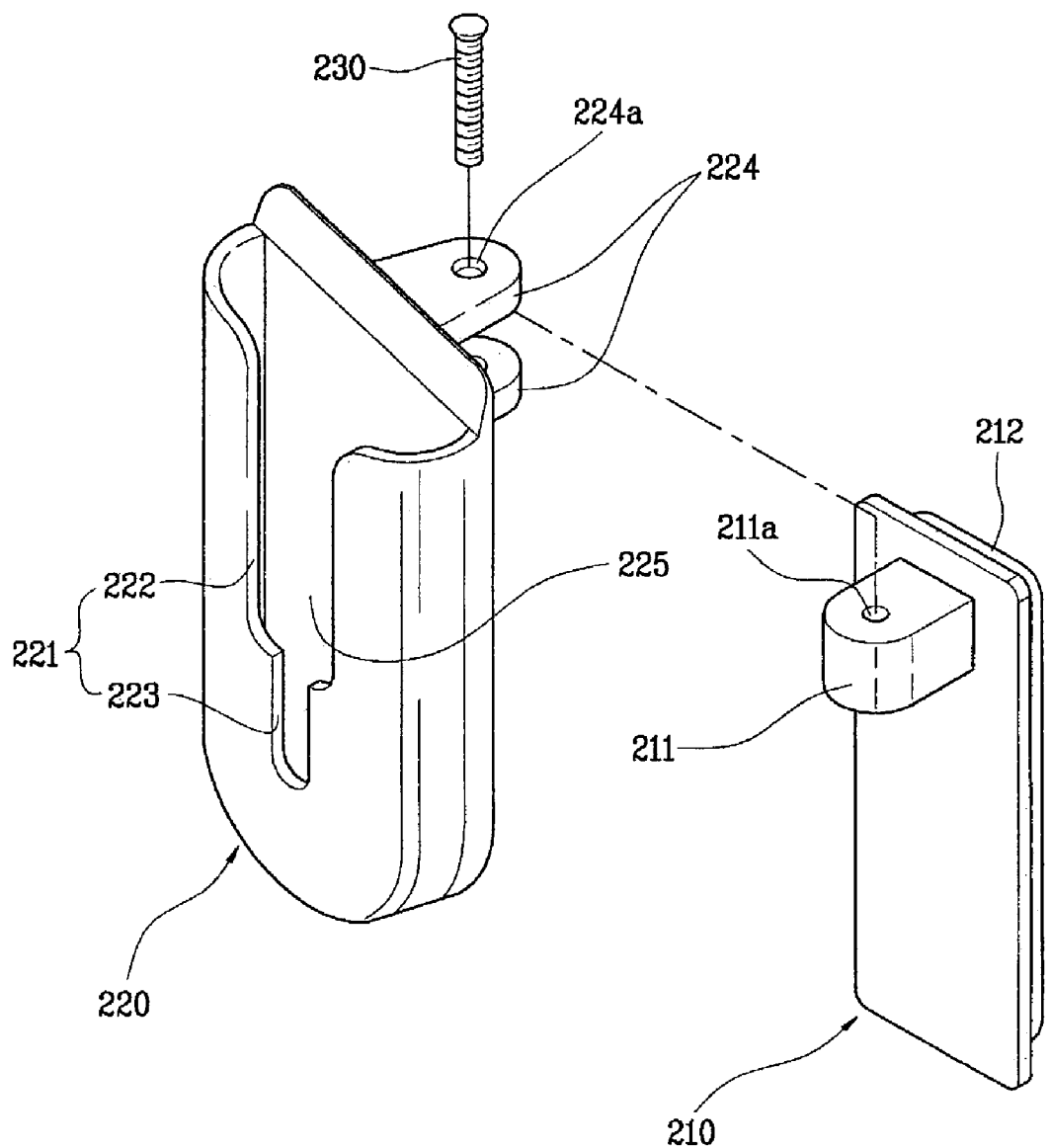
FIG. 19 is an exploded perspective view of a mobile phone holder according to the fourth embodiment of the invention.
Figure 20:
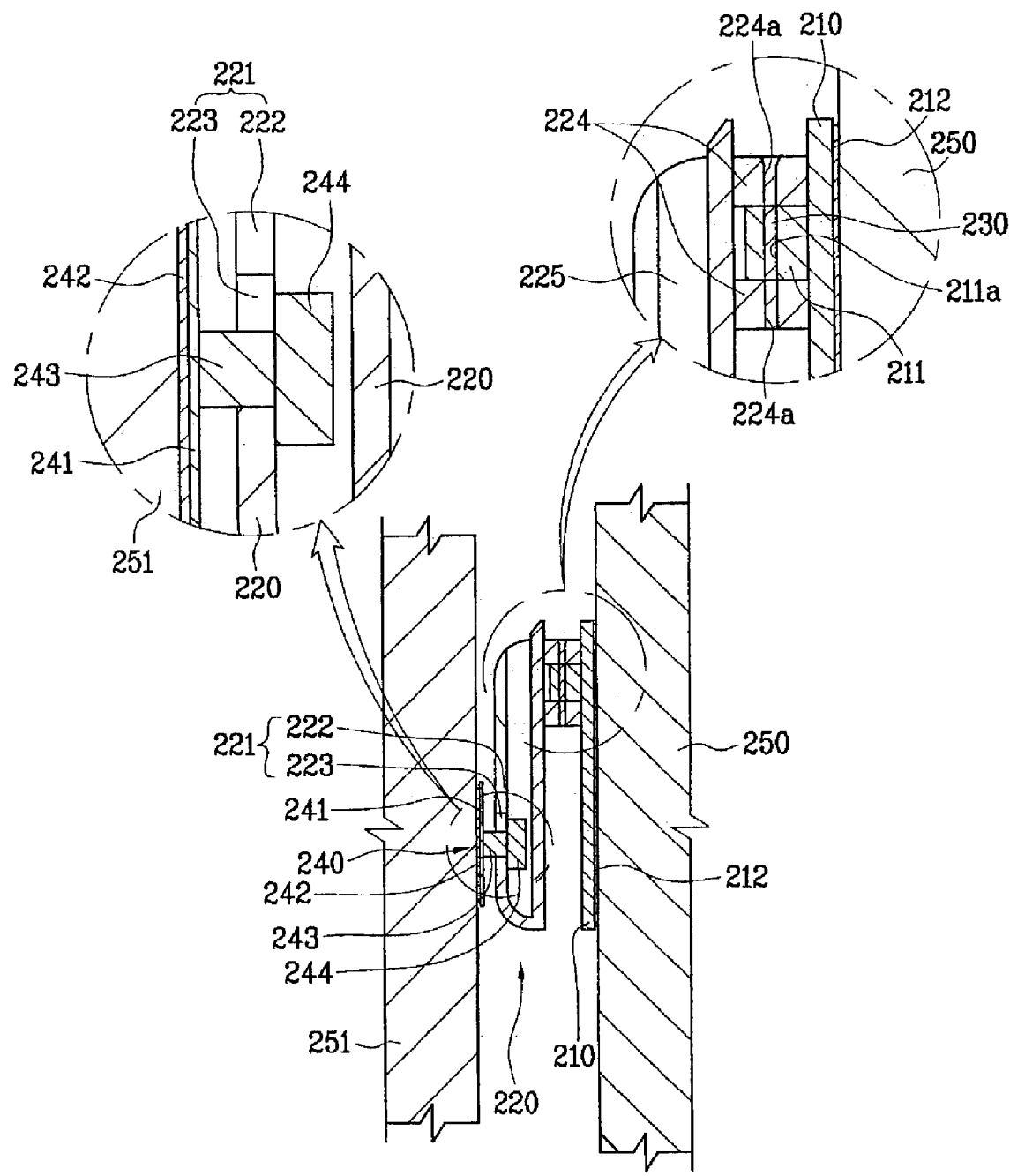
FIG. 20 is a sectional view of an application of the mobile phone holder shown in FIG. 19.

In the meantime, FIGS. 19 and 20 illustrate a mobile phone holder according to the fourth embodiment of the invention, in which the holder is installed in the interior of a vehicle.

The mobile phone holder according to the fourth embodiment of the invention generally comprises a fixing plate 210 and a holder body 220 which is hinged to the fixing plate 210 for enabling mutual angle adjustment in a horizontal direction. The fixing plate 210 is made of flexible synthetic resin into an elongated and flat configuration. On the rear face of the fixing plate 210, a double-sided tape 212 is attached. The fixing plate 210 has a coupling member 211 in an upper front portion thereof for enabling hinge coupling. The coupling member 211 has a pinhole 211a which is vertically penetrated through the coupling member 211.

The holder body 220 is made of rigid synthetic resin, and has a hanging groove 121 in a front portion and two coupling pieces 224 projected from a rear portion. The coupling pieces 224 are vertically distanced for a predetermined gap to correspond to the coupling members 211. The coupling pieces 224 have pinholes 224 perforated through the same corresponding to the pinhole 211a of the coupling member 211.

In the meantime, in order to easily fix the mobile phone, the hanging slot 221 comprises a guide slot 222 and a fixing slot 223 having a narrower gap than the guide slot 222 as shown in FIG. 19. That is, the wider guide slot 222 is provided in the upper portion for receiving a hanger piece which will be described hereinafter and the narrower fixing slot 223 is provided under the guide slot 222 for stably fixing the hanger piece 240. The hanging slot 221 configured as above has a large space 225 therein as shown in FIG. 19.

The fixing plate 210 and the holder body 220 configured as above are hinge coupled by inserting a hinge pin 230 into pin holes 211a and 224a after inserting the coupling member 211 between the coupling pieces 224. The coupling pieces 224 and the coupling member 211 are arranged in upper portions of the holder body 220 and the fixing plate 210.

In order to use the inventive holder assembled as above, as shown in FIG. 20, the double-side tape 212 is attached to a dashboard 250 of the vehicle after removing a release paper (not shown) from the double-sided tape 212 attached to the rear face of the fixing plate 21 and then a separate hanger piece 240 is attached to the rear face of a mobile phone 251. The hanger piece 240 has a known flat configuration comprising a fixing portion 241 in the rear face to which the double-sided tape 242 is attached, a connecting portion 243 projected from the front face of the fixing portion 241 and a coupling portion 244 widened from a distal end of the connecting portion 243.

In the above-configured hanger piece 240 which is attached to the rear face of the mobile phone, when the mobile phone is pressed downward after the coupling portion 244 is placed in a space 225 of the holder body 220 as shown in FIG. 20, the connecting portion 243 of the hanger piece 240 slides down along the guide slot 222 and the fixing slot 223 in the hanging slot 221 and then is stopped and supported at the lowermost end of the fixing slot.

If coupled as above, the coupling portion 244 of the hanger piece 240 is fixed as inserted into the space 225 so that the mobile phone 251 can be stably fixed.

The above-mentioned mobile phone holder can be attached to a body of the mobile phone in use or can be applied to a mobile phone housing or holster in the same manner with the following advantages:

First, since the coupling portion for hinge coupling is provided at one end in length of the fixing plate 210, the fixing plate 210 is more flexible compared to a conventional holder with a rigid connecting portion formed in a central portion thereof and thus can be easily and stably to the dashboard 250 of the vehicle even though the dashboard 250 is heavily curved.

Second, since the fixing plate 210 and the holder body 220 are hinged to each other, the angle of the mobile phone can be readily adjusted by laterally rotating the holder body 220 when an LCD of the mobile phone is not seen to a driver owing to reflection of light or the driver wants to adjust the angle of the mobile phone into any angle favorable to him/her.

Third, the hanging slot 221 has the wider guide slot 222 and the narrower fixing slot 223 so that the mobile phone can be coupled in an easier manner.

Figure 21:
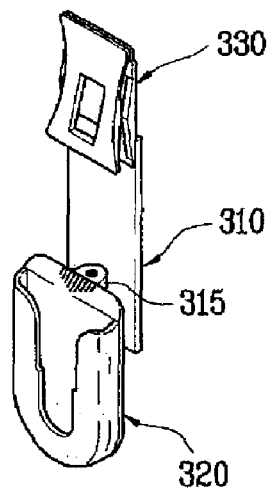
FIG. 21 is a perspective view of a mobile phone holder according to the fifth embodiment of the invention.
Figure 22:
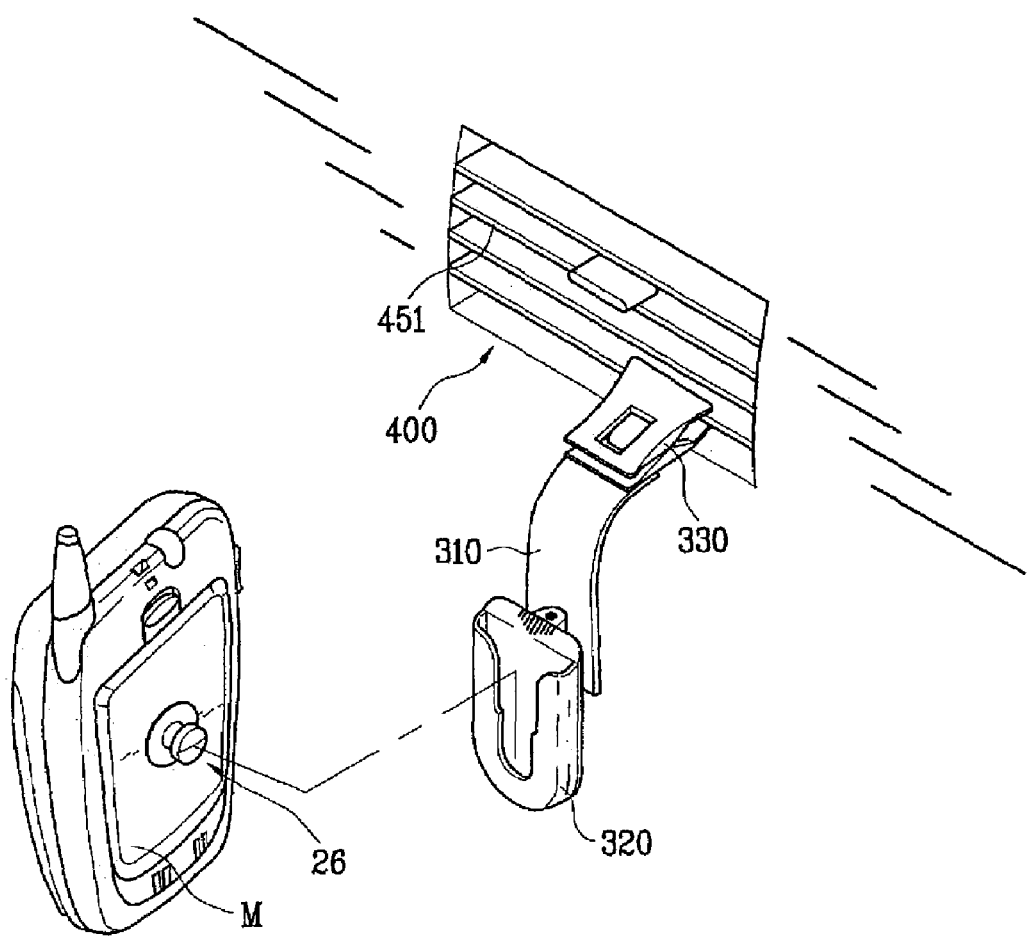
FIG. 22 is a sectional view of an application of the mobile phone holder shown in FIG. 21.

FIGS. 21 and 22 illustrate a mobile phone holder for vehicle according to the fifth embodiment of the invention, in which the holder of this embodiment can be fixed to a structure such as plates for adjusting the direction of wind in a ventilator instead of being attached to the dashboard.

As shown in FIGS. 21 and 22, the holder of this embodiment has a configuration similar to the above-described holder for vehicle except that a coupling member for hinge coupling is arranged in the lower end of a fixing plate 310, a coupling piece 324 is arranged in the upper end of a holder body 320, and then the coupling member and the coupling piece 324 are hinged to each other. In addition, a gripper 330 is further provided in the other end or the upper end of the fixing plate 310. It is preferred if the gripper 330 is connected via a rivet for enabling free rotation about the fixing plate 310. In this embodiment of the holder having the above configuration, it is not needed to attach a double-sided tape to the rear face of the fixing plate 310.

As shown in FIG. 22, the holder of the above configuration is fixed to a structure such as the plates 451 for adjusting the direction of wind in the ventilator 400 of the vehicle by clamping the structure with the gripper 330 when the fixing plate 310 is not readily attached to the vehicular dashboard. Applications of the holder of this embodiment are the same as above embodiments.

What is claimed is:

1. A mobile phone holder assembly comprising:
    a hanger piece fixed to a rear face of a mobile phone or a mobile phone housing, the hanger piece comprising radially configured meshing projections adapted to maintain a rotation angle of the hanger piece;
    a holder body having a guide in a front portion into which the hanger piece is inserted downward and supported therein and a vertical slide slot;
    a locker coupled to the slide slot in a vertically displaceable manner;
    a rear plate fixed to a rear face of the holder body;
    means for restraining vertical displacement of the locker and supporting the hanger piece inserted through the guide in a rotatable position;
    a clip disposed in a rear portion of the rear plate, the clip being pivotable about the upper end; and
    a locking member for pressing or releasing the upper end of the clip so that a lower portion of the clip contacts with a lower portion of the rear plate while pressing the same.

2. A mobile phone holder assembly in accordance with claim 1, wherein the supporting means comprise:
    an operating hole perforated in the lower end of the locker;
    a through-hole formed in the lower end of a rear portion of the holder body;
    an operating piece inserted into the through-hole and having a latching portion, the latching portion being projected to a front portion of the locker via the operating hole and inserted into a central bore of the hanger piece; and
    an elastic member interposed between the rear plate and the operating piece for elastically supporting the operating piece to the rear plate.

3. A mobile phone holder assembly in accordance with claim 2, further comprising:
    an inclined pressing face in an upper portion of the operating hole facing toward a rear face; and
    an inclined guide face in an upper portion of the latching portion corresponding to the pressing face, wherein a tolerance is set between the pressing face and the guide face.

4. A mobile phone holder assembly in accordance with claim 1, wherein the hanger piece further comprises:
    a fixing projection projected forward in the lower end of the locker and for contacting with meshing projections of the hanger piece; and
    an elastic member for elastically supporting the locker in a vertical direction between the lower end of the locker and the holder body to press the fixing projection against the meshing projections of the hanger piece.

5. A mobile phone holder assembly in accordance with claim 1, wherein the rear plate has a horizontal slot in the upper end, and the clip is folded in the upper end forming a folded portion to be inserted and settled into the horizontal slot.

6. A mobile phone holder assembly in accordance with claim 1, further comprising an elastic member between the upper end of the rear plate and the upper end of the clip for elastically supporting the clip against the rear plate.

7. A mobile phone holder assembly in accordance with claim 1, wherein the locking member comprises:
    hinge brackets projected rearward in the rear plate; and
    a locking piece disposed on the rear portion of the clip and rotatable to the hinge brackets around a hinge pin,
    wherein the locking piece has:
        a plate-shaped gripping portion for being gripped by a user for operation;
        a hinge integrally formed at one end of said gripping portion for receiving the hinge pine for coupling thereto; and
        a pressing portion extended from the hinge portion substantially perpendicular to the gripping portion for pressing or releasing the rear portion of the clip according to rotation of the gripping portion.

8. A mobile phone holder assembly in accordance with claim 7, further comprising two through-holes in an upper middle portion of the clip, wherein the hinge brackets are projected beyond the rear portion of the clip via the through-holes, and the hinge and pressing portion of the locking piece have incisions for receiving distal ends of the hinge brackets.

9. A mobile phone holder assembly in accordance with claim 1, further comprising means for restraining rotation angle of the hanger piece in respect to the holder body.

10. A mobile phone holder assembly in accordance with claim 9, wherein the restraining means comprise:
    an angle-restraining projection projected from one portion of meshing projections of the hanger piece; and
    angle-restraining thresholds disposed at both lateral sides of the lower end of the slide slot for contacting with the angle-restraining projection in rotation of the hanger piece to restrain the rotation thereof.

11. A mobile phone holder assembly comprising:

a hanger piece fixed to a rear face of a mobile phone or a mobile phone housing;

a holder body having a guide in a front portion into which the hanger piece is inserted downward and supported therein and a vertical slide slot;

means for restraining rotation angle of the hanger piece in respect to the holder body, wherein the restraining means has:

an angle-restraining projection projected from one portion of radially configured meshing projections of the hanger piece; and angle-restraining thresholds disposed at both lateral sides of the lower end of the slide slot for contacting with the angle-restraining projection in rotation of the hanger piece to restrain the rotation thereof.

12. A mobile phone holder assembly comprising:

a hanger piece fixed to a rear face of a mobile phone or a mobile phone housing;

a rectangular panel-shaped fixing plate detachably attached to an exterior structure;

a holder body coupled to the fixing plate in a laterally rotatable position via a rotation mechanism and having a hanging slot in a front portion into which the hanger piece is inserted downward and supported therein; and means for attaching the fixing plate to the exterior structure, wherein the rotation mechanism comprises:

a coupling member projected in a front portion of the fixing plate and having a pinhole which is vertically perforated;

a pair of coupling pieces disposed on a rear face of the holder body opposed to each other with a predetermined gap and having pin holes in positions corresponding to a pin hole of the coupling member when the coupling member is inserted between the coupling pieces; and a hinge pin inserted into the pinholes of the coupling pieces and the coupling member when the coupling member is placed between the coupling pieces.

13. A mobile phone holder assembly in accordance with claim 12, wherein the coupling member is provided in the front upper end of the fixing plate.

14. A mobile phone holder assembly in accordance with claim 13, wherein the attaching means comprises a double-sided tape which is attached to a rear face of the fixing plate.

15. A mobile phone holder assembly in accordance with claim 12, wherein the coupling member is provided in the front lower end of the fixing plate.

16. A mobile phone holder assembly in accordance with claim 12, wherein the attaching means comprise a gripper coupled to the upper end of the fixing plate.

* * * * *